(12) United States Patent
Bahulkar et al.

(10) Patent No.: US 12,717,652 B2
(45) Date of Patent: Aug. 25, 2026

(54) POWER ATTRIBUTION AND THROTTLING ON MOBILE DEVICES

(71) Applicant: Snap Inc., Santa Monica, CA (US)

(72) Inventors: Tejas Bahulkar, Sunnyvale, CA (US); Dunxu Hu, Venice, CA (US); Yizhou Ma, Los Angeles, CA (US); Jonah Hephzibah Okike, Los Angeles, CA (US); John James Robertson, Los Angeles, CA (US); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 505 days.

(21) Appl. No.: 18/133,644

(22) Filed: Apr. 12, 2023

(65) Prior Publication Data

US 2024/0345895 A1 Oct. 17, 2024

(51) Int. Cl.
*G06F 9/50* (2006.01)
*G06F 1/16* (2006.01)
(Continued)

(52) U.S. Cl.
CPC ............ *G06F 9/5094* (2013.01); *G06F 1/163* (2013.01); *G06F 1/3203* (2013.01); *G06F 1/3293* (2013.01); *G06F 9/5005* (2013.01)

(58) Field of Classification Search
None
See application file for complete search history.

(56) References Cited

U.S. PATENT DOCUMENTS 12,555,339 B2 2/2026 Arya et al.
2010/0174928 A1* 7/2010 Borghetti .............. G06F 9/4893 713/320
2018/0267839 A1 9/2018 Maisuria et al.

FOREIGN PATENT DOCUMENTS

WO WO-2018175138 A1 * 9/2018 ............. G06F 1/329
WO 2022271606 12/2022

OTHER PUBLICATIONS

International application No. PCT/US2018/022083, International Preliminary Report on Patentability, Date of Issuance Sep. 24, 2019 (Year: 2019).*

(Continued)

*Primary Examiner* — Qing Yuan Wu
(74) *Attorney, Agent, or Firm* — Schwegman Lundberg & Woessner, P.A.

(57) ABSTRACT

Systems, methods, and computer readable media for power and temperature attribution on mobile devices. Example methods include granting a request for a resource, estimating an energy usage used by the resource for the application, where the estimating is based on a resource utilization and a resource usage duration, and in response to the power usage transgressing a power usage budget for the application, throttling the power usage of the application. The application may provide a module to be called for the application to reduce its power usage or temperature generation. The mobile device provides the application with the temperature generation and power usage of the application on a per resource used basis. The mobile device determines the power usage and the temperature generation of the resources of the mobile device. In some examples, the mobile device is an augmented reality (AR), virtual reality (VR), or mixed reality (MR) head-wearable device.

20 Claims, 14 Drawing Sheets

(51) Int. Cl.
*G06F 1/3203* (2019.01)
*G06F 1/3293* (2019.01)

(56) References Cited

OTHER PUBLICATIONS

Sahin et al., "On the Impacts of Greedy Thermal Management in Mobile Devices", Jun. 2015, IEEE Embedded Systems Letters, vol. 7, No. 2, pp. 55-58. (Year: 2015).*

"International Application Serial No. PCT/US2024 023595, International Search Report mailed Jul. 9, 2024", 3 pgs.

"International Application Serial No. PCT/US2024/023595, Written Opinion mailed Jul. 9, 2024", 7 pgs.

"European Application Serial No. 23748416.7, Communication Pursuant to Article 94(3) EPC mailed Feb. 25, 2026", 6 pgs.

* cited by examiner

FIG. 2

POWER ATTRIBUTION AND THROTTLING ON MOBILE DEVICES

TECHNICAL FIELD

Examples of the present disclosure relate generally to power attribution and throttling on mobile devices. More particularly, but not by way of limitation, examples of the present disclosure relate to a mobile device such as a virtual reality (VR), mixed reality (MR), or an augmented reality (AR) mobile device where the VR, MR, or AR mobile device attributes power consumption and temperature generation to processes and throttles processes that exceed their power consumption or temperature generation budget.

BACKGROUND

Users increasingly want mobile devices to operate in a more user-friendly manner with more functions. However, often, the mobile devices are susceptible to overheating and often the mobile devices have limited batteries to provide additional functions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of a messaging system, according to some examples, that has both client-side and server-side functionality.

DETAILED DESCRIPTION

Figure 1:
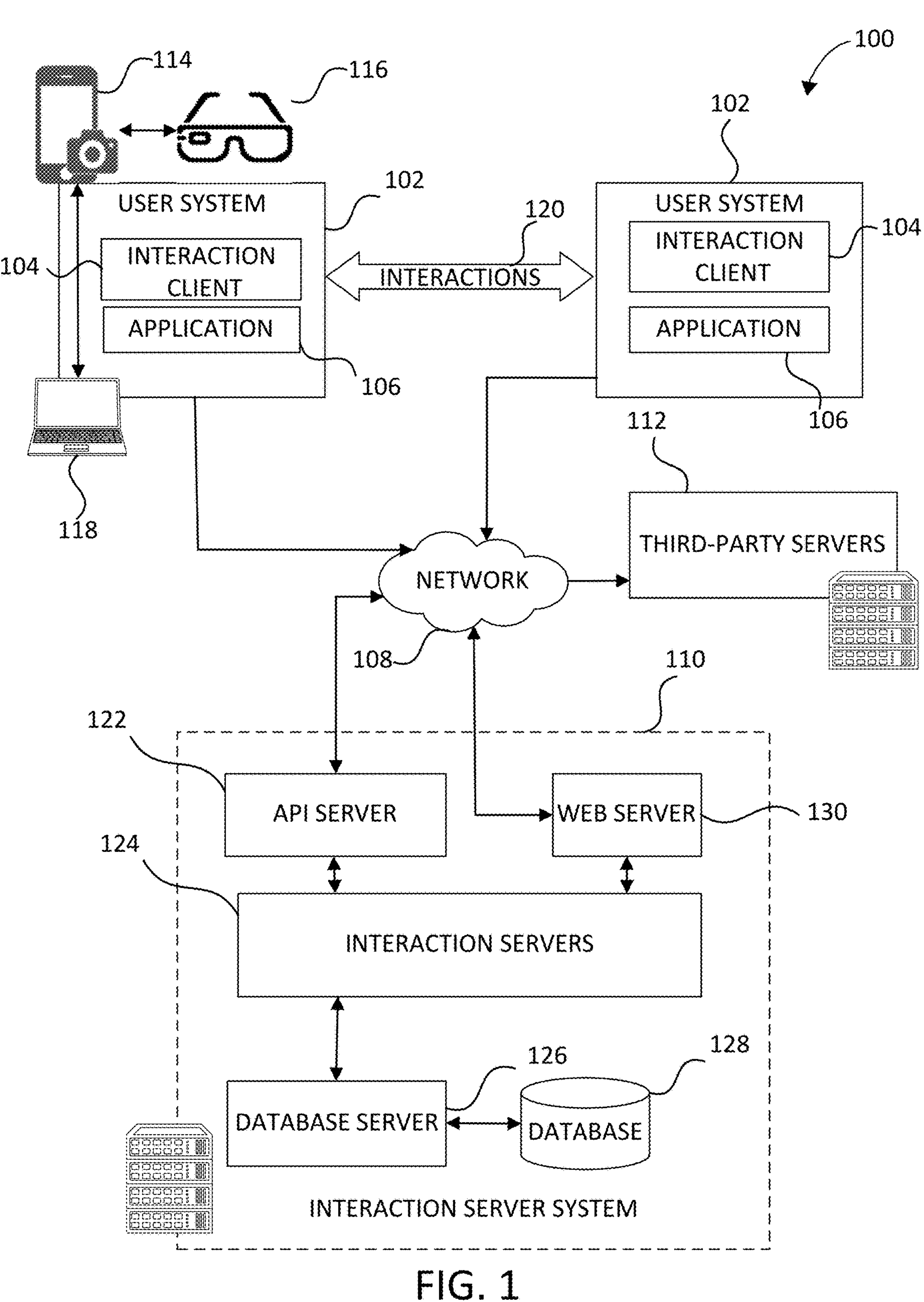
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term mobile device is used as an illustrative device; however, one skilled in the art will recognize that the methods, systems, and computer readable medium disclosed herein are applicable to other mobile devices such as wearable devices or non-wearable devices including AR, VR and MR head-wearable devices.

A technical challenge is how to increase the usefulness of a battery 918 on a mobile device and how to reduce the temperature generation 1010. The technical challenge is addressed by, referring to FIGS. 9 and 10, determining a power consumption 1004 and temperature generation 1010 on a per resource 1002 basis for processes 1019. An operating system 942 provides the process 1019 with information regarding the energy used 1024 and the temperature used 1028 by the process 1019 on per resource 1002 basis. The process 1019 may reduce its power consumption 1004 and temperature generation 1010 based on the amount of energy used 1024 and/or temperature used 1028. Additionally, the operating system 942 may maintain an energy budget 1022 and/or temperature budget 1026 for the process 1019. If the process 1019 exceeds its energy budget 1022 or temperature budget 1026, then a throttle module 1018 throttles the process 1019. For example, the throttle module 1018 changes a state 1008 of a resource 1002 the process 1019 is using such as reducing a clock speed or frequency of a GPU processor 932, 940. This may slow the process 1019 but reduce power consumption 1004 and temperature generation 1010 of the process 1019.

In some examples, the designer of the applications 928, 944 uses the information from the operating system 942 regarding the power consumption 1004 and temperature generation 1010 to reduce the power consumption 1004 or the temperature generation 1010. For example, there may be a component of the system 900 that is particularly vulnerable to overheating so the application 928, 944 may be designed to reduce the use of the component.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems), an interaction server system 110 and third-party servers 112). An interaction client 104 can also communicate with locally hosted applications 106 using Applications Program Interfaces (APIs).

Each user system 102 may include multiple user devices, such as a computing device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
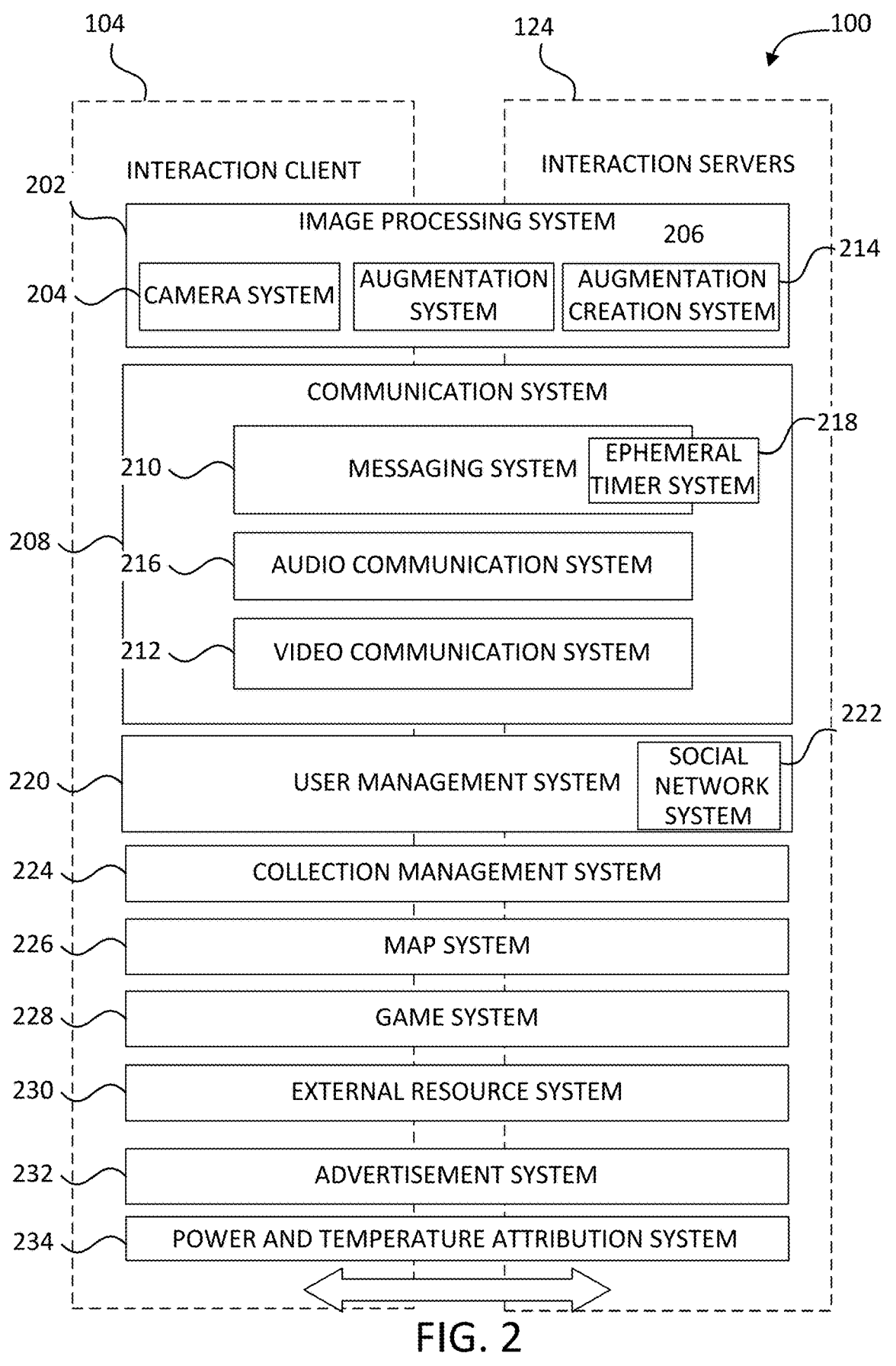

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

The power and temperature attribution system 234 supports system 900 for power and temperature attribution on mobile devices. In one example, the power and temperature system 234 maintains power consumption 1004 and temperature generation 1010 information for different resources 1002 of the system 900. The system 900 accesses the information via the wireless module 904, in accordance with some examples. The power and temperature attribution system 234 may act as an intermediary for sending data between the computing device 114 and the head-wearable apparatus 116 where the system 900 is part of the head-wearable apparatus 116. In some examples, the power and temperature attribution system 234 performs one or more functions described in conjunction with the system 900.

Data Architecture

Figure 3:
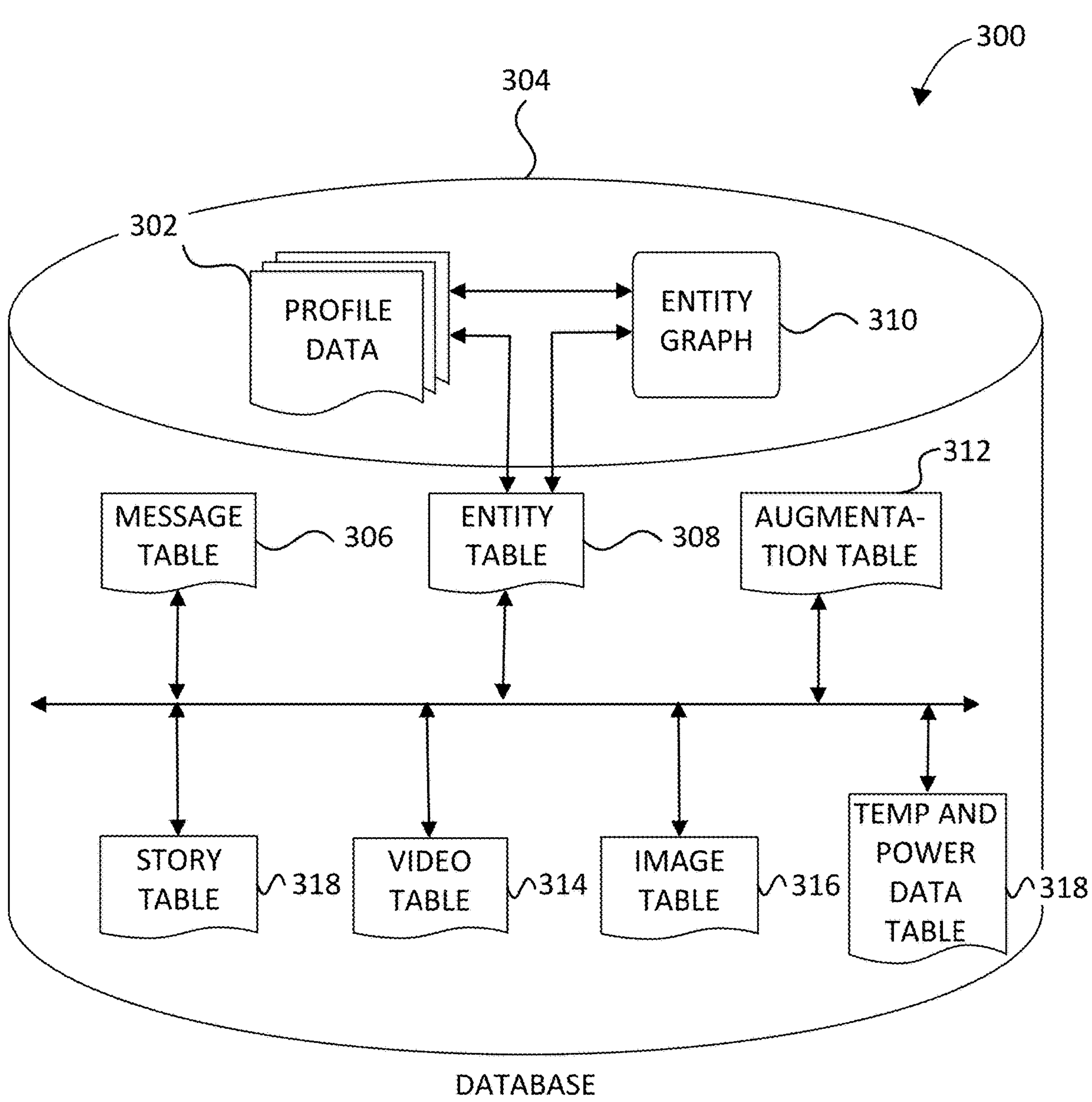
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes temperature (temp) and power data table 318. The temperature and power data table 318 includes, referring to FIGS. 9 and 10, applications 928, 944, power consumption 1004, and temperature generation 1010 information for different resources 1002 of the system 900.

Data Communications Architecture

Figure 4:
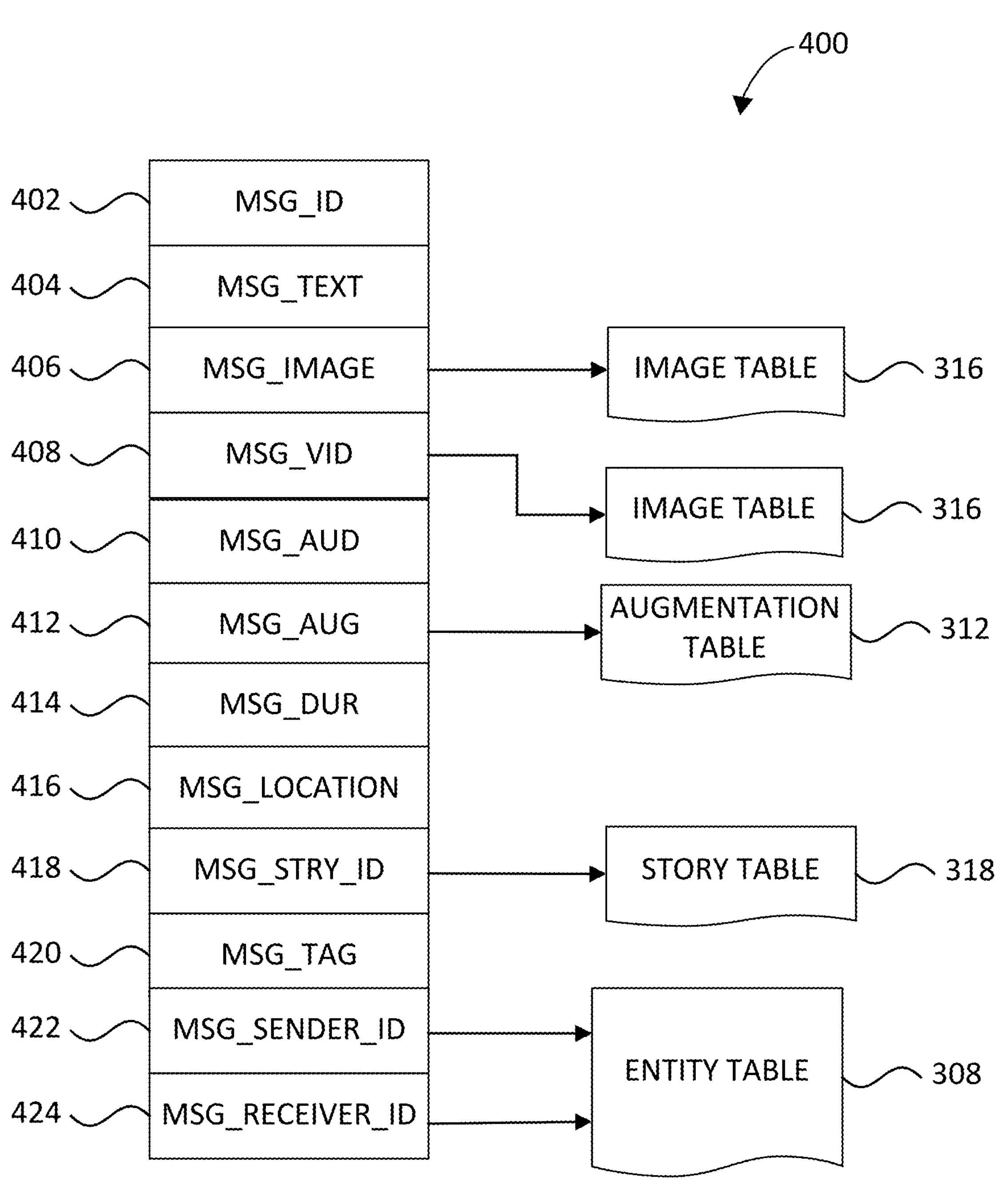
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402 is a unique identifier that identifies the message 400.
- Message text payload 404 is text, to be generated by a user via a user interface of the user system 102, and that is included in the message 400.
- Message image payload 406 is image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414 is a parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

System with Head-Wearable Apparatus

Figure 5:
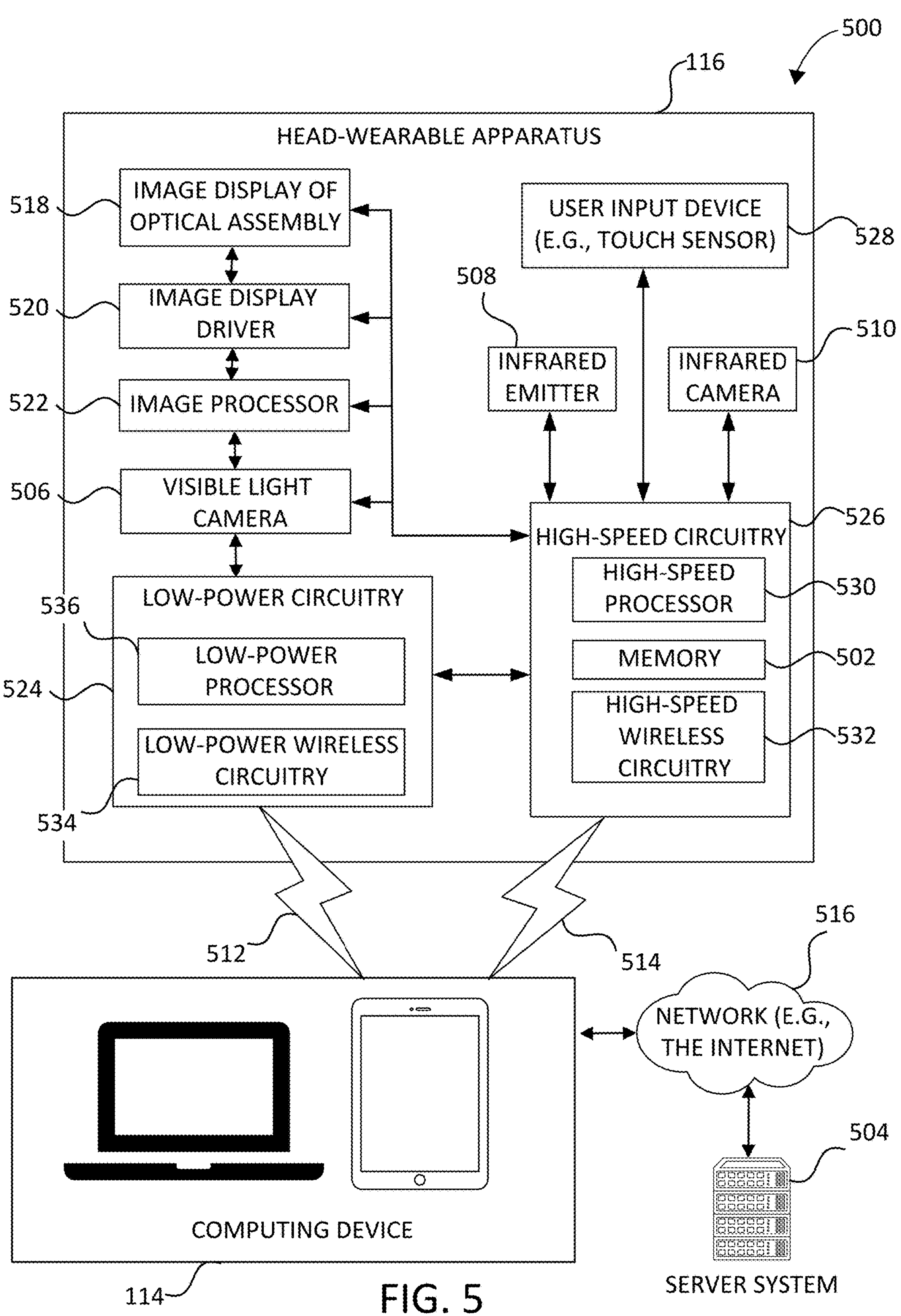
FIG. 5 illustrates a system in which the head-wearable apparatus, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a computing device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The computing device 114 connects with head-wearable apparatus 116 using both a low-power wireless connection 512 and a high-speed wireless connection 514. The computing device 114 is also connected to the server system 504 and the network 516, in accordance with some examples. The computing device 114 may be a portable computing device such as a smart phone, tablet, laptop, or another type of computing device 114 such as a desktop computer, or another type of computing device 114.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Computing device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the computing device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the computing device 114 and the head-wearable apparatus 116.

The computing device 114 includes a processor and a network communication interface coupled to the processor. The network communication interface allows for communication over the network 516, low-power wireless connection 512, or high-speed wireless connection 514. Computing device 114 can further store at least portions of the instructions for generating binaural audio content in the computing device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the computing device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the computing device 114 via the low-power wireless circuitry 534 or high-speed wireless circuitry 532.

Machine Architecture

Figure 6:
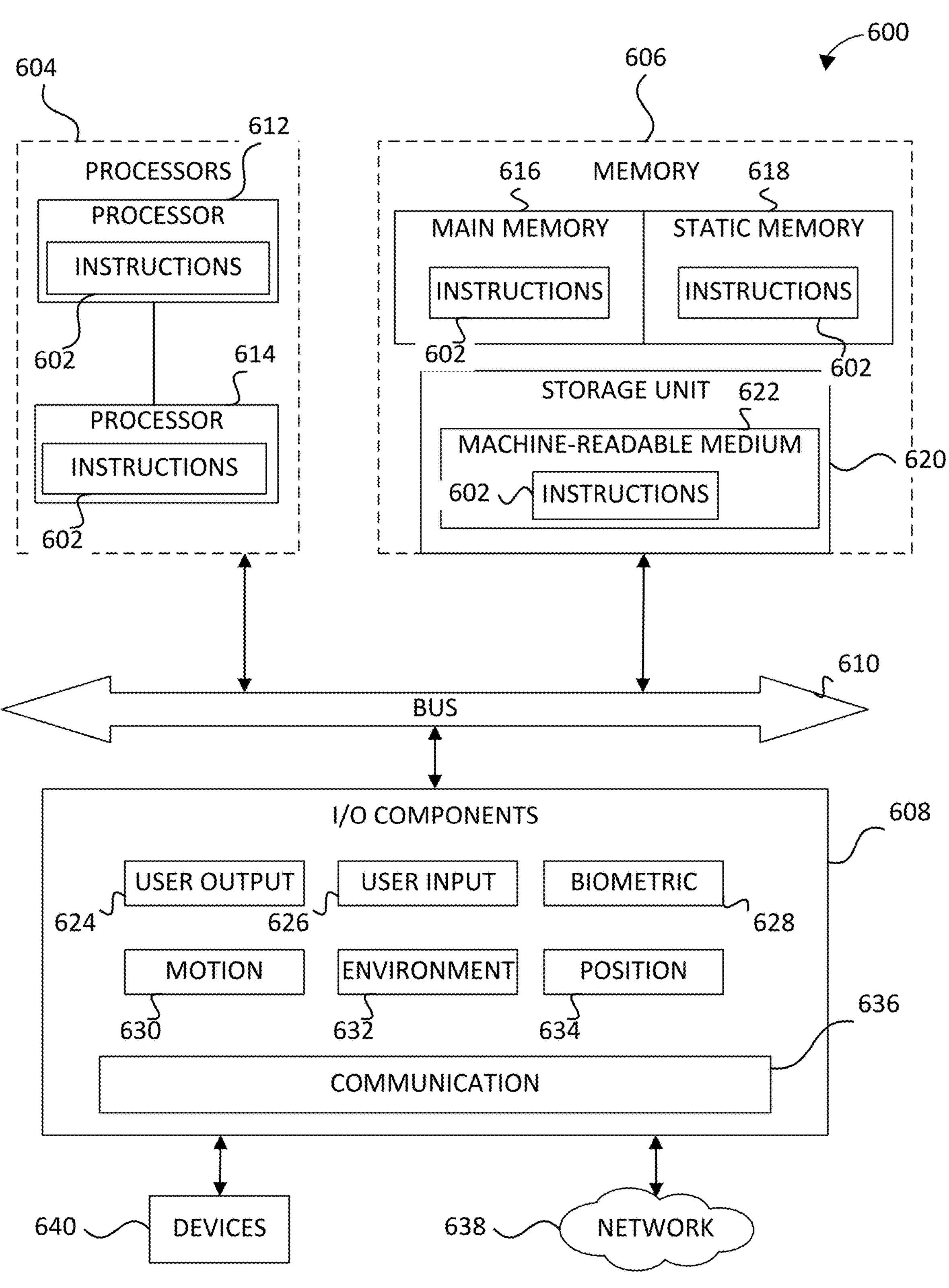
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system 102 or any one of multiple server devices forming part of the interaction server system 110. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
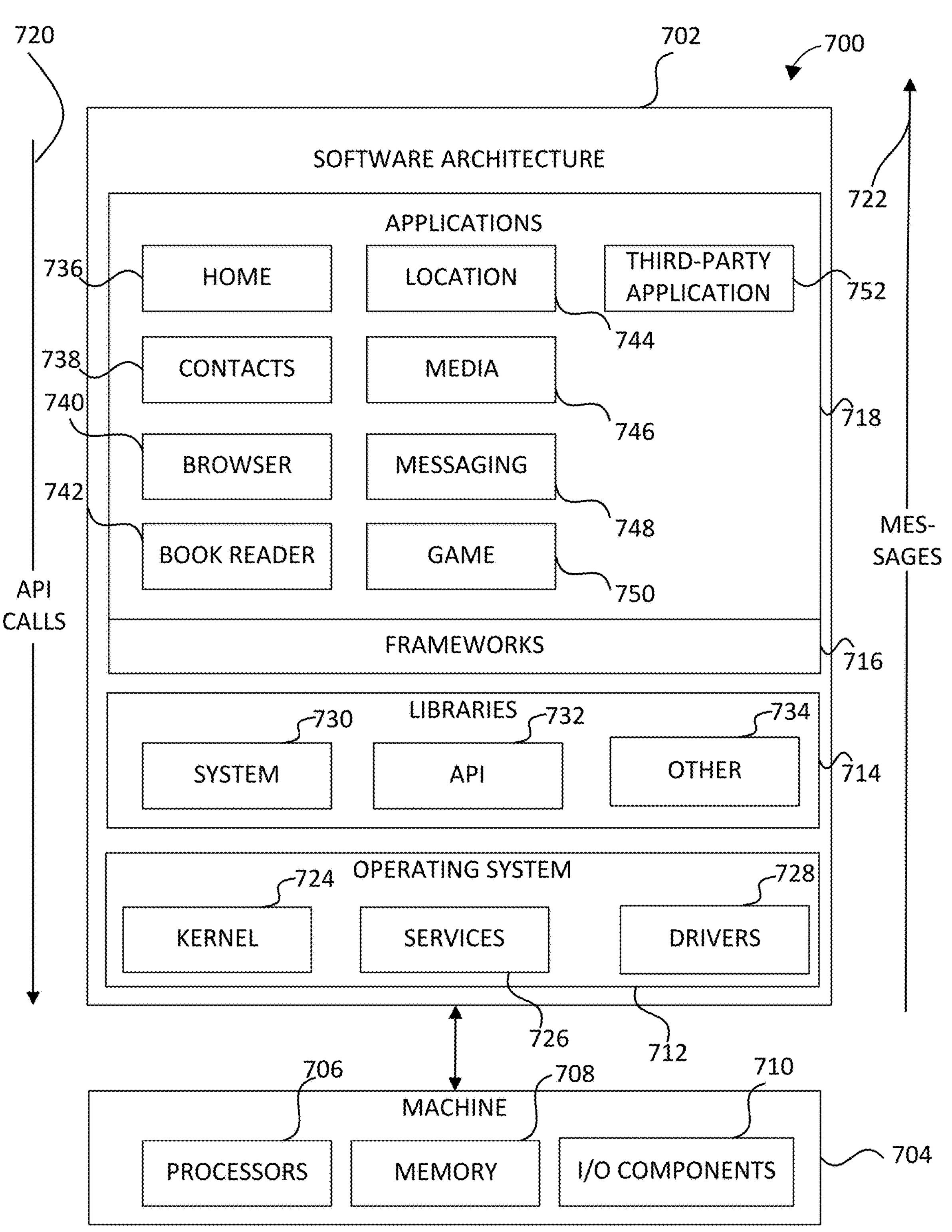
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

Figure 8:
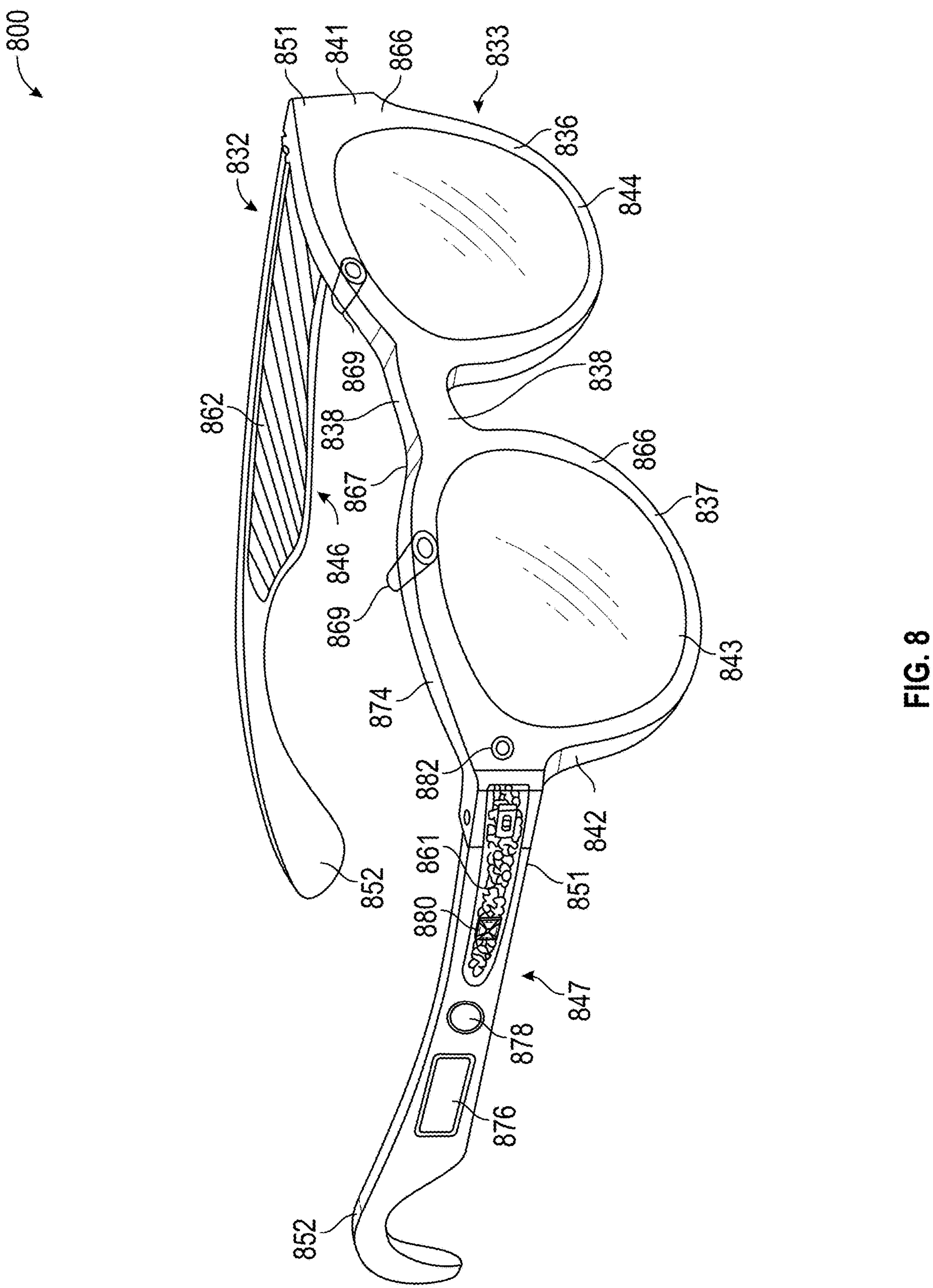
FIG. 8 is a perspective view of a head-wearable apparatus in the form of glasses, in accordance with some examples.

FIG. 8 is a perspective view of a head-wearable apparatus in the form of glasses 800, in accordance with some examples. The glasses 800 are an article of eyewear including electronics, which operate within a network system for communicating image and video content. FIG. 8 illustrates an example of the head-wearable apparatus 116. In some examples, the wearable electronic device is termed AR glasses. The glasses 800 can include a frame 832 made from any suitable material such as plastic or metal, including any suitable shape memory alloy. The frame 832 can have a front piece 833 that can include a first or left lens, display, or optical element holder 836 and a second or right lens, display, or optical element holder 837 connected by a bridge 838. The front piece 833 additionally includes a left end portion 841 and a right end portion 842. A first or left optical element 844 and a second or right optical element 843 can be provided within respective left and right optical element holders 836, 837. Each of the optical elements 843, 844 can be a lens, a display, a display assembly, or a combination of the foregoing. In some examples, for example, the glasses 800 are provided with an integrated near-eye display mechanism that enables, for example, display to the user of preview images for visual media captured by cameras 869 of the glasses 800.

The frame 832 additionally includes a left arm or temple piece 846 and a right arm or temple piece 847 coupled to the respective left and right end portions 841, 842 of the front piece 833 by any suitable means such as a hinge (not shown), so as to be coupled to the front piece 833, or rigidly or fixedly secured to the front piece 833 so as to be integral with the front piece 833. Each of the temple pieces 846 and 847 can include a first portion 851 that is coupled to the respective end portion 841 or 842 of the front piece 833 and any suitable second portion 852, such as a curved or arcuate piece, for coupling to the ear of the user. In one example, the front piece 833 can be formed from a single piece of material, so as to have a unitary or integral construction. In one example, the entire frame 832 can be formed from a single piece of material so as to have a unitary or integral construction.

The glasses 800 include a computing device, such as a computer 861, which can be of any suitable type so as to be carried by the frame 832 and, in one example, of a suitable size and shape, so as to be at least partially disposed in one or more of the temple pieces 846 and 847. In one example, the computer 861 has a size and shape similar to the size and shape of one of the temple pieces 846, 847 and is thus disposed almost entirely if not entirely within the structure and confines of such temple pieces 846 and 847.

In one example, the computer 861 can be disposed in both of the temple pieces 846, 847. The computer 861 can include one or more processors with memory, wireless communication circuitry, and a power source. The computer 861 comprises low-power circuitry, high-speed circuitry, location circuitry, and a display processor. Various other examples may include these elements in different configurations or integrated together in different ways. Additional details of aspects of the computer 861 may be implemented as described with reference to the description that follows.

The computer 861 additionally includes a battery 862 or other suitable portable power supply. In one example, the battery 862 is disposed in one of the temple pieces 846 or 847. In the glasses 800 shown in FIG. 8, the battery 862 is shown as being disposed in the left temple piece 846 and electrically coupled using a connection 874 to the remainder of the computer 861 disposed in the right temple piece 847. One or more input and output devices can include a connector or port (not shown) suitable for charging a battery 862 accessible from the outside of the frame 832, a wireless receiver, transmitter, or transceiver (not shown), or a combination of such devices.

The glasses 800 include digital cameras 869. Although two cameras 869 are depicted, other examples contemplate the use of a single or additional (i.e., more than two) cameras 869. For ease of description, various features relating to the cameras 869 will be described further with reference to only a single camera 869, but it will be appreciated that these features can apply, in suitable examples, to both cameras 869.

In various examples, the glasses 800 may include any number of input sensors or peripheral devices in addition to the cameras 869. The front piece 833 is provided with an outward-facing, forward-facing, front, or outer surface 866 that faces forward or away from the user when the glasses 800 are mounted on the face of the user, and an opposite inward-facing, rearward-facing, rear, or inner surface 867 that faces the face of the user when the glasses 800 are mounted on the face of the user. Such sensors can include inward-facing video sensors or digital imaging modules such as cameras 869 that can be mounted on or provided within the inner surface 867 of the front piece 833 or elsewhere on the frame 832 so as to be facing the user, and outward-facing video sensors or digital imaging modules such as the cameras 869 that can be mounted on or provided with the outer surface 866 of the front piece 833 or elsewhere on the frame 832 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 843, 844 (or lenses) to provide a mixed reality or augmented reality experience for the user of the glasses 800.

The glasses 800 further include an example of a camera control mechanism or user input mechanism comprising a camera control button mounted on the frame 832 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 832 adjacent to its surface for detecting the presence of a user's finger, to dispose the touch-sensitive button to the engaged condition when the user touches a finger to the corresponding spot on the outer surface 866 of the frame 832. It will be appreciated that the above-described camera control button and capacitive touch button are but two examples of a haptic input mechanism for single-action control of the camera 869, and that other examples may employ different single-action haptic control arrangements.

The computer 861 is configured to perform the methods described herein. In some examples, the computer 861 is coupled to one or more antennas for reception of signals from a GNSS and circuitry for processing the signals where the antennas and circuitry are housed in the glasses 800. In some examples, the computer 861 is coupled to one or more wireless antennas and circuitry for transmitting and receiving wireless signals where the antennas and circuitry are housed in the glasses 800. In some examples, there are multiple sets of antennas and circuitry housed in the glasses 800. In some examples, the antennas and circuitry are configured to operate in accordance with a communication protocol such as Bluetooth™, Low-energy Bluetooth™, IEEE 802, IEEE 802.11az/be, and so forth. In some examples, PDR sensors housed in glasses 800 and coupled to the computer 861. In some examples, the glasses 800 are VR headsets where optical elements 843, 844 are opaque screens for displaying images to a user of the VR headset. In some examples, the computer 861 is coupled to user interface elements such as slide or touchpad 876 and button 878. A long press of button 878 resets the glasses 800. The slide or touchpad 876 and button 878 are used for a user to provide input to the computer 861 and/or other electronic components of the glasses 800. The glasses 800 include one or more microphones 882 that are coupled to the computer 861. The glasses 800 include one or more gyroscopes 880.

Power Attribution and Throttling on Apparatuses

Figure 9:
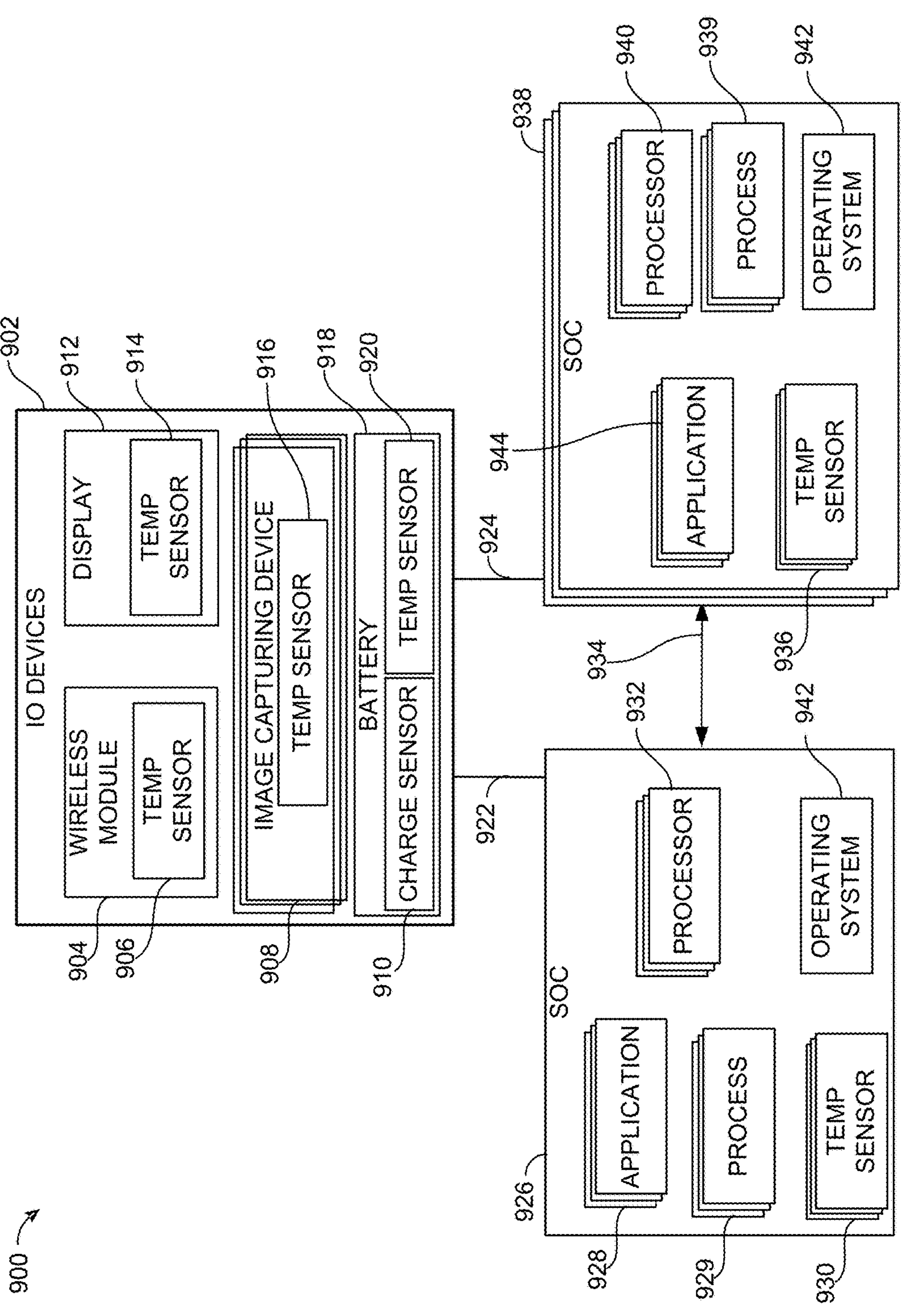
FIG. 9 illustrates a system for power attribution and throttling on mobile devices, in accordance with some examples.

FIG. 9 illustrates a system 900 for power attribution and throttling on mobile devices, in accordance with some examples. The system 900 is an apparatus of a head-wearable apparatus 116 such as glasses 800 of FIG. 8, in accordance with some examples. The system 900 may include other devices such as a portion of the interaction server system 110, and/or the user system 102, that may perform one or more of the operations described herein. In accordance with some examples, the head-wearable apparatus 116 and/or glasses 800 are termed AR wearable devices, MR wearable devices, and/or VR wearable devices.

One or more systems on a chip (SoC or systems on-chip) 926, 938 are connected to input/output (IO) device 902. The SOC 926, 938 include processors 932, 940, applications 928, temperature (temp) sensors 930, and an operating system 942. The SOC 926, 938 may include other components such as memory, other interfaces, on-chip IO devices, timing circuitry, fault circuitry, and so forth. The processors 932, 940 may be graphics processor units (GPU), central processing units (CPUs), and/or another type of processor. The operating system 942 may be distributed across the SOCs 926, 938 and may have separate components per SOC 938. The logic of the operating system 942 may be implemented in one or more of: hardware, firmware, and/or software. The temperature sensors 930, 936 provide data that indicates a temperature or relative temperature of the SOC 926, 938, respectively.

The applications 928, 944 provide functionality such as 3D graphics, graphical compositions, video recording, hand tracking, virtual IO, determining depth of objects from stereo images, and so forth. Additionally, the applications 928, 944 may be applications 928, 944, for users of the apparatus to use such as a card game application 944, object identification application 944 and so forth. The applications 928, 944 may be software, firmware, or hardware. For example, the applications 928, 944 may reside in a memory of the SOC 926, 938, respectively. The processes 929, 939 are active applications 928, 944 or other instructions that are currently active and being executed by the operating system 942.

The SOCs 926, 938 are connected with an inter-SOC communication bus 934. The SOCs 926, 938 may transfer data such as the applications 928, 944 or information related to the applications 928, 944 and/or processes 929, 939, using the inter-SOC communication bus 934. The applications 928, 944 may be resident with a particular SOC 926, 938 or the applications 928, 944 may be distributed among SOCs 926, 938. The applications 928, 944 may be received via the wireless module 904 or transferred between the SOCs 926, 938.

The IO devices 902 include wireless module 904, display 912, image capturing device 908, and battery 918. The IO devices 902 may include additional devices such as devices that enable the user of the apparatus to receive output or provide input to the system 900 and other IO components 608 such as is discussed in conjunction with FIGS. 6 and 8.

The wireless module 904 is configured to perform wireless communication protocols with other devices such as the computing device 114, the interactive server system 110, user system 102, and so forth. The communication protocols include LE Bluetooth, Institute for Electrical and Electronic Engineers (IEEE) 802.11 communication protocols, proprietary communications protocols, 3GPP communication protocols, and so forth. The wireless module 904 communicates with hardware such as transceiver circuitry and antennas to perform the wireless protocols. The wireless module 904 may communicate with the computing device 114, the interactive server system 110, and/or user system 102 via intermediate devices such as an access point, a node B, and so forth. The display 912 is an electronic device configured to present content to a user of the system 900. For example, the glasses 800 may have an integrated near-eye display mechanism.

The image capturing devices 908 captures images of the real-world with sensors. For example, the sensors may be charge-coupled device (CCD) sensors and the active-pixel sensor (CMOS sensor) sensors. The image capturing device 908 may include color camera sensors, compact vision (CV) camera sensor, and so forth. The IO devices 902 are connected to one or more SOCs 926, 938, via connections 922, 924. The battery 918 is source of electrical power. For example, the battery 918 may be a rechargeable lithium battery. The battery 918 has a charge sensor 910 that generates data that indicates a charge level of the battery 918. The temperature sensors 906, 914, 916, and 920 generate data that indicates a temperature of the wireless module 904, display 912, image capturing devices 908, and battery 918, respectively. There may be more or fewer temperature sensors 906, 914, 916, and 920 and, in some examples, the temperature sensors 906, 914, 916, and 920 indicate a temperature of more than one device.

Figure 10:
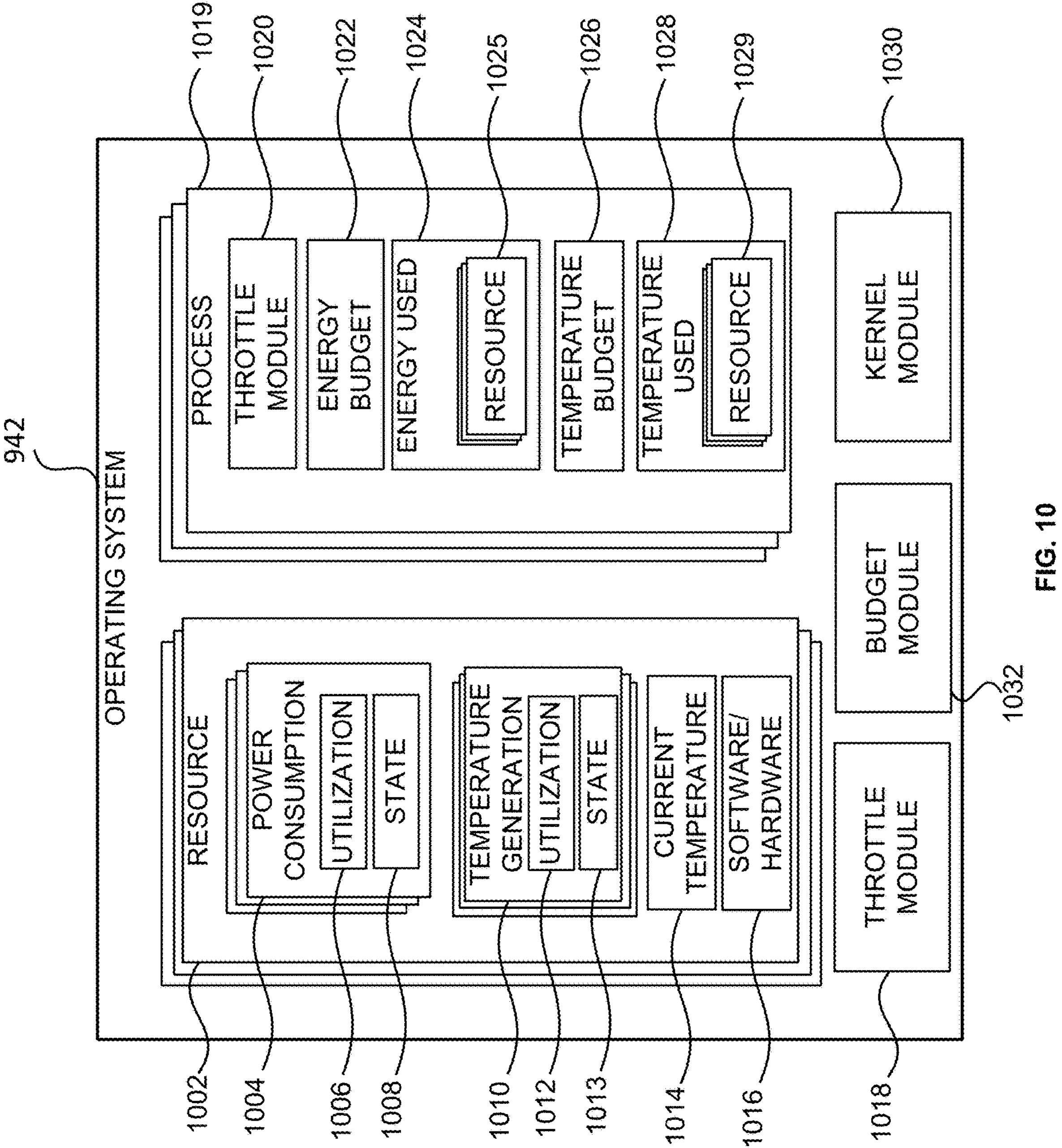
FIG. 10 illustrates the operating system, in accordance with some examples.

FIG. 10 illustrates the operating system 942, in accordance with some examples. The operating system 942 maintains information regarding resources 1002 and processes 1019. The resources 1002 include the IO devices 902, application 928, and so forth. The operating system 942 accesses information regarding the power consumption 1004. A power consumption 1004 is estimated an estimated power consumption 1004 for the resource 1002 based on a utilization 1006 of the resource 1002 and, in some examples, further based on a state 1008 of the resource 1002. For example, a processor 940 may have different frequency levels, which is represented by the state 1008, and the processor 940 has a utilization 1006 such as 10 percent that is attributable to a process 1019. The operating system 942 can use the power consumption 1004 information about the resource 1002 to determine the energy used 1024 by the process 1019.

For example, a resource 1002 may be a graphics processing unit (GPU) that at state 1008 with a clock speed of 1,000 MHz consumes 37 milli-Watts (mW) per percent of utilization 1006 of the GPU resource 1002. The operating system 942 can determine based on a time that the process 1019 uses the GPU resource 1002 and a utilization 1006 of the GPU, the energy used 1024 in mW-seconds or joules (J) used by the process 1019 for the GPU resource 1025. The process 1019 is an application 928, 944 being executed or run. The process 1019 is process 929 and/or process 940. The operating system 942 runs on the SOCs 926, 938 and the process 1019 may be run on one or more of the SOCs 926, 938.

The temperature generation 1010 is an indication of an increase in temperature based on the utilization 1012 and state 1013 of the resource 1002. For example, continuing with the example above. If the GPU resource 1002 is in a 1,000 MHz state 1008, then the temperature generation 1010 is 0.01 degrees F. per 1 percent utilization 1012 per second of use. The temperature generation 1010 enables the operating system 942 to attribute a change in the current temperature 1014 of a resource 1002 because of the use of the resource 1002 by a process 1019. In some examples, the temperature generation 1010 is non-linear and depends on total power consumption 1004 and/or on utilization of the resource 1002. The kernel module 1030 may approximate the temperature generation 1010 based on the total power consumption 1004 and/or resource utilization.

Software or hardware 1016 indicates whether the resource 1002 is software or hardware. For example, a process 1019 may be an end user application 928, 944 such as identifying objects for the user or playing a video for the user. When the process 1019 directly executes and uses a GPU resource 1002, then the GPU resource 1002 is hardware. And when the process 1019 uses an application 928, 944 such as an application 928, 944 to identify hand gestures, then this is software. The application 928, 944 from which the process 1019 originated may provide services for other applications 928, 944.

The operating system 942 executes or runs the applications 928, 944, which becomes a process 1019 in execution or in being run. The operating system 942 may use an interpreter to run the applications 928, 944, in which case the process 1019 being tracked may be the interpreter and the application 928, 944 is attributed with power consumption 1004 and temperature generation 1010 based on the use of the interpreter resource 1002. For example, the operating system 942 attributes the power consumption 1004 and temperature generation 1010 to an application 928, 944 using the interpreter resource 1002, which is a process 1019 when being used, based on the power consumption 1004 and temperature generation 1010 of the interpreter resource 1002 when the interpreter resource 1002 is running the application 928, 944. The current temperature 1014 is an indication of the temperature of the resource 1002, which may be determined based on a temperature sensor 906, 914, 920, 930, 936.

When the resource 1002 is a software process, the operating system 942 may use previously determined estimates for power consumption 1004 and temperature generation 1010 for running the software resource 1002. For example, for a hand gesture recognition resource 1002, the operating system 942 may access information that indicates a power consumption 1004 and temperature generation 1010 for the hand gesture recognition resource 1002 based on an amount of time the hand gesture recognition resource 1002 is active and, in some examples, further based on state 1008 of the other resources 1002 such as the GPU or CPU resource 1002.

The operating system 942 monitors processes 1019 for energy used 1024 per resource 1025 and temperature used 1028. The energy budget 1022 indicates an amount of energy the process 1019 is budgeted to use. The energy budget 1022 may per resource 1002. The temperature budget 1026 indicates a change in temperature that the process 1019 is budgeted. The temperature budget 1026 may be per resource 1002.

The kernel module 1030 is configured to perform operations that require the kernel of the operating system 942 to perform. For example, the kernel module 1030 provides services to stop processes 1019 and to log a time a process 1019 is started and stopped.

The budget module 1032 determines an energy budget 1022 and temperature budget 1026 for a process 1019. In some examples, the energy budget 1022 and temperature budget 1026 are predetermined and associated with the application 928, 944. In some examples, the energy budget 1022 and temperature budget 1026 are determined based on current temperatures 1014 of the resources and/or the charge of the battery 918 based on the charge sensor 910. The budget module 1032 sends to the process 1019 updates on the energy used 1024 and the temperature used 1028 so that the process 1019. The budget module 1032 sends to the process 1019 when the process 1019 is completed a total energy used 1024 and a total temperature used 1028. The budget module 1032 determines the power consumption 1004 and temperature generation 1010 to use for a resource 1002 based on the utilization 1006, 1012, and state 1008, 1013.

The throttle module 1018 performs action when a process 1019 exceeds its energy budget 1022 or temperature budget 1026. For example, when a process 1019 exceeds its energy budget 1022 or exceeds its temperature budget 1026, the throttle module 1018 calls the throttle module 1020 that is part of the process 1019. The throttle module 1020 of the process 1019 may terminate the process 1019, reduce the energy used 1024 and/or temperature used 1028, or perform another action. The throttle module 1018 may perform another action such analyzing the energy used 1024 and temperature used 1028 and placing a resource 1002 that is being used by the process 1019 into a state 1008 that uses less power consumption 1004 and/or temperature generation 1010. For example, in the GPU resource 1002 example, the throttle module 1018 may reduce a number of cores of the GPU resource 1002 that are turned on, change the 1,000 MHz state 1008 to a 500 MHz state 1008, or reduce the availability of one or more cores of the GPU resource 1002 to the process 1019.

In some examples, throttle module 1020 reduces the features of the application 928, 944. For example, the throttle module 1020 may disable hand tracking. The throttle module 1018 may reduce or lower a priority of the process 1019 so that it is executed or run less frequently. In some examples, the throttle module 1018 may throttle the use of a resource 1002. For example, if a current temperature 1014 of the resource 1002 exceeds or transgresses a threshold, the throttle module 1018 may reduce access to the resource 1002.

In some examples, the throttle module 1018 will lower a priority of processes 1019 that are using the resource 1002. In some examples, the throttle module 1018 will suspend processes 1019 that request to use the resource 1002. In some examples, the throttle module 1018 will indicate to the process 1019 that using a resource 1002 may result in the process 1019 being suspended or the throttle module 1018 may indicate to the process 1019 that the resource 1002 is currently unavailable due to its current temperature 1014. The throttle module 1018 may provide a time period when the resource 1002 may become available. In some examples, the throttle module 1018 will switch the resource 1002 for another resource 1002 that may perform the operation. For example, if a GPU resource 1002 has a current temperature 1014 that exceeds or transgress a threshold temperature, then the throttle module 1018 substitutes another GPU resource 1002, a CPU resource 1002, or sends the operation to be performed by another device.

In some examples, the throttle module 1018 may suspend the process 1019 or reduce a priority of the process 1019. In some examples, the throttle module 1018 may remove a resource 1002 from the process 1019. For example, if the wireless module 904 is becoming too hot, then the throttle module 1018 may suspend the use of the wireless module 904 by the process 1019 for a period of time. In some examples, the throttle module 1018 or throttle module 1020 will, in response, to the amount of energy used 1024 or the temperature used 1028, indicate to the process 1019 to offload computationally intensive functions to another device via the wireless module 904. For example, the head-wearable apparatus 116 will offload image processing for hand tracking to a computing device 114 such as a user system 102 that may be mobile phone.

Figure 11:
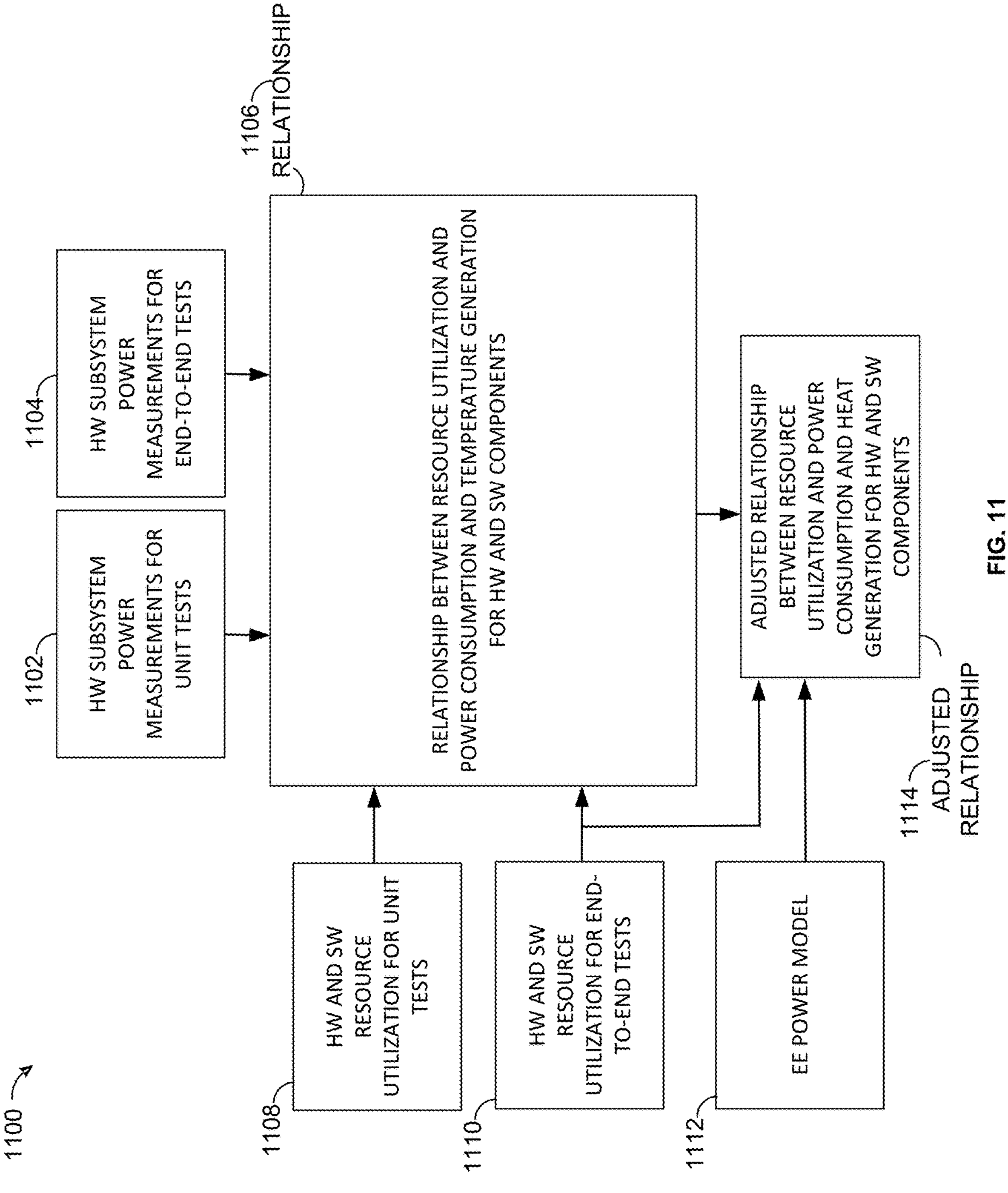
FIG. 11 illustrates a system for determining power estimates and temperature estimates for hardware and software components of a mobile device, in accordance with some examples

In other examples, the throttle module 1018 calls a throttle module 1020 of the process 1019. The throttle module 1020 of the process 1019 may determine its own actions to reduce the power consumption 1004 and temperature generation 1010. For example, the process 1019 may reduce the features available for an end-user application 928, 944. The process 1019 is an application 928, 944 that is being executed. In some examples, the process 1019 reduces the features being offered by not providing hand tracking. In some examples, the throttle module 1020 will throttle the process 1019 if FIG. 11 illustrates a system 1100 for determining power estimates and temperature estimates for hardware and software components of a mobile device, in accordance with some examples. The relationship 1106 is a relationship between resource utilization and power consumption and temperature generation for hardware (HW) and software (SW) components. The relationship 1106 is determined empirically.

In block 1108, HW and SW resource utilization is determined for unit tests. And in block 1102 the HW subsystem power measurements are determined for the unit tests based on the utilization. For example, individual resources 1002 of the system 900 are measured for power consumption 1004 based on the utilization 1006 and state 1008 of the resource 1002. Example resources 1002 include the processors 932, 940, such as GPUs and CPUs, the display 912, the wireless module 904, the inter-SOC communication bus 934, and applications 928 such as 3D graphics, compositing, video recording, VIO, hand tracking, and depth from stereo images. When a resource 1002 is SW such as hand tracking, then the power measurements are used for each of the HW subsystems that are used by the SW. The temperature generation 1010 for a resource 1002 is determined in a similar or same way.

In block 1110, HW and SW resource utilization is determined for end-to-end tests. And in block 1104 the HW subsystem power measurements for estimating power consumption 1004 are determined for the end-to-end tests based on the utilization. The end-to-end tests run the entire SW application 928, 944, and the unit tests run portions of the SW such as only the hand tracking or only a communication portion. In the end-to-end HW tests, for example, both the GPU and CPU may be running while in the unit test only the GPU or CPU may be tested. In the end-to-end SW tests the entire SW application 928, 944 is executed. The temperature generation 1010 for a resource 1002 is determined in a similar or same way.

The relationship 1106 is determined based on running the empirical tests and determining the relationship between the power usage and the resource utilization. The relationship 1114 is then adjusted to generate the adjusted relationship 1114 based on electronic/electrical engineering (EE) power models. For example, equations of the power usage of the GPU and CPU are provided describing the power usage of the product. The relationship 1106 may be adjusted to fit or be less deviant from theoretical EE power models 1112.

In some examples, the CPUs and/or GPUs are heterogeneous architectures with different portions that may be used separately. The different portions may consume different amounts of power. The utilization in these examples may be determined for each portion.

TABLE 1

| Per Process Resource Utilization | | | | |
|---|---|---|---|---|
| Process | CPU | GPU A | GPU B | inter-SOC communication bus |
| Interpreter | 60% | 30% | 25% | 5% |

The interpreter process 1019 has a utilization of the CPU of 60%, a utilization of the GPU A of 30%, a utilization of the GPU B of 25%, and a utilization of the inter-SOC communication bus 934 of 5%.

TABLE 2

| Resource Power Consumption | | | | | |
|---|---|---|---|---|---|
| Resource | Duration | Mean | Min | Max | Std Dev |
| CPU | 1 s | 9.4 | 8.3 | 10.1 | .33 |
| GPU A | 1 s | 8.2 | 7.1 | 9.2 | .30 |
| GPU B | 1 s | 8.5 | 7.5 | 9.4 | .33 |
| Inter-SOC communication Bus | 1 s | .1 | .05 | .12 | .01 |

Using Table 1 and Table 2 an estimate for the power consumption 1004 of the interpreter process 1019 can be made. Table 1 is for a minute of execution by the interpreter process 1019, so the numbers in Table 2 are multiplied by 60. Using the mean power consumption is used from Table 2, the power consumed by the interpreter process 1019 is (for CPU) 9.4*60*0.6+ (for GPU A) 8.2*60*0.3+ (For GPU B) 8.5*60*0.25+ (for inter-SOC communication bus) 0.1*60*0.05, which equals 338.4+147.6+127.5+0.3, or 613.8 mW for the 60 seconds the interpreter process 1019 was executing.

Figure 12:
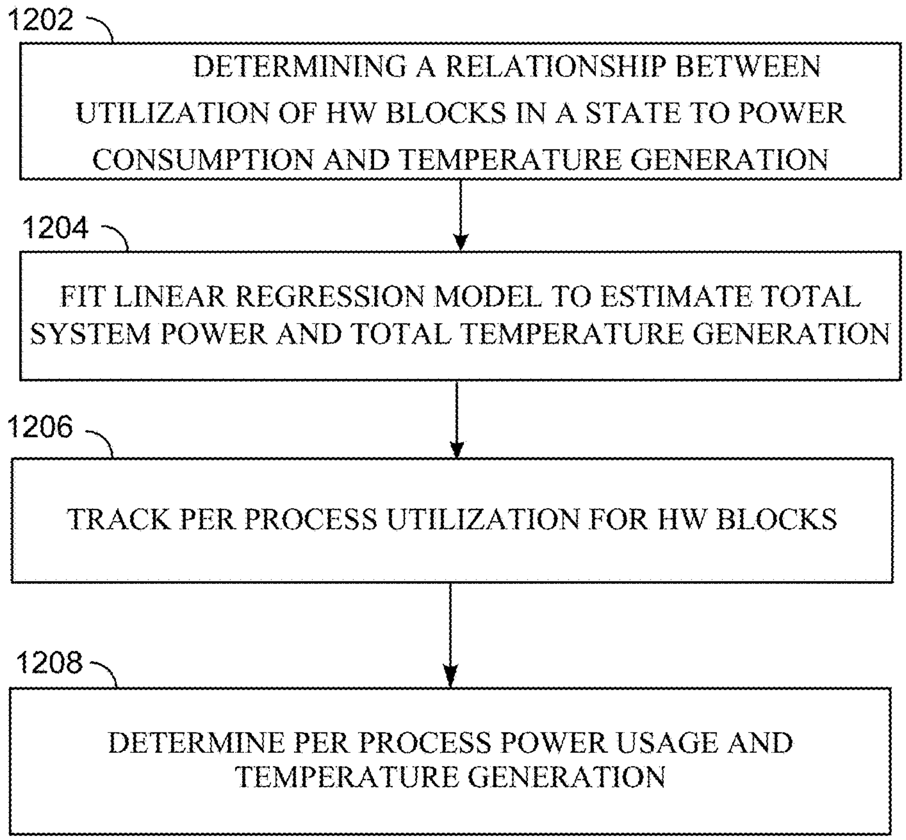
FIG. 12 illustrates a method for power attribution on mobile devices, in accordance with some examples.

FIG. 12 illustrates a method 1200 for power attribution on mobile devices, in accordance with some examples. The method 1200 begins at operation 1202 with determining a relationship between utilization of HW blocks in a state to power consumption and temperature generation. For example, as discussed in conjunction with FIG. 11, the adjusted relationship 1114 is determined. The method 1200 continues at operation 1204 with fitting a regression module to estimate the total system power usage and total temperature generation. For example, a linear regression module is used with all the HW blocks and their resource power consumption as discussed in conjunction with Table 2. The linear regression is then set equal to the actual power consumption of the entire apparatus based on the changes in the charge of the battery 918. The coefficients are adjusted based on the actual power consumption. The coefficients of the linear model then are used as the power consumption 1004 of each of the HW block resources 1002 for a given utilization 1006 and state 1008. In some examples, the linear regression is a non-negative linear regression model where all the terms are additive and represent power consumption per unit resource utilization. Similarly, the linear regression for temperature generation is then set equal to the actual temperature generation based on the change in temperature from the temperature sensors 906, 914, 920, 930, 936. The coefficients of the linear model are then used as the temperature generation 1010 for a utilization 1012 and state 1013 for the different resources 1002.

The method 1200 continues at operation 1206 with tracking per process utilization for HW blocks. For example, as discussed in conjunction with Tables 1 and 2, the utilization of each resource 1002 is tracked for a process 1019 by the operating system 942. The method 1200 continues at operation 1208 with determining per process power usage and temperature generation. For example, as disclosed in conjunction with Tables 1 and 2, for each resource 1002 the power consumption 1004 and temperature generation 1010 is determined based on the utilization 1006, 1012, and state 1008, 1013 by the operating system 942.

The method 1200 may optionally include one or more additional operations. The operations of method 1200 may be performed in a different order. One or more of the operations of method 1200 may be optional.

Figure 13:
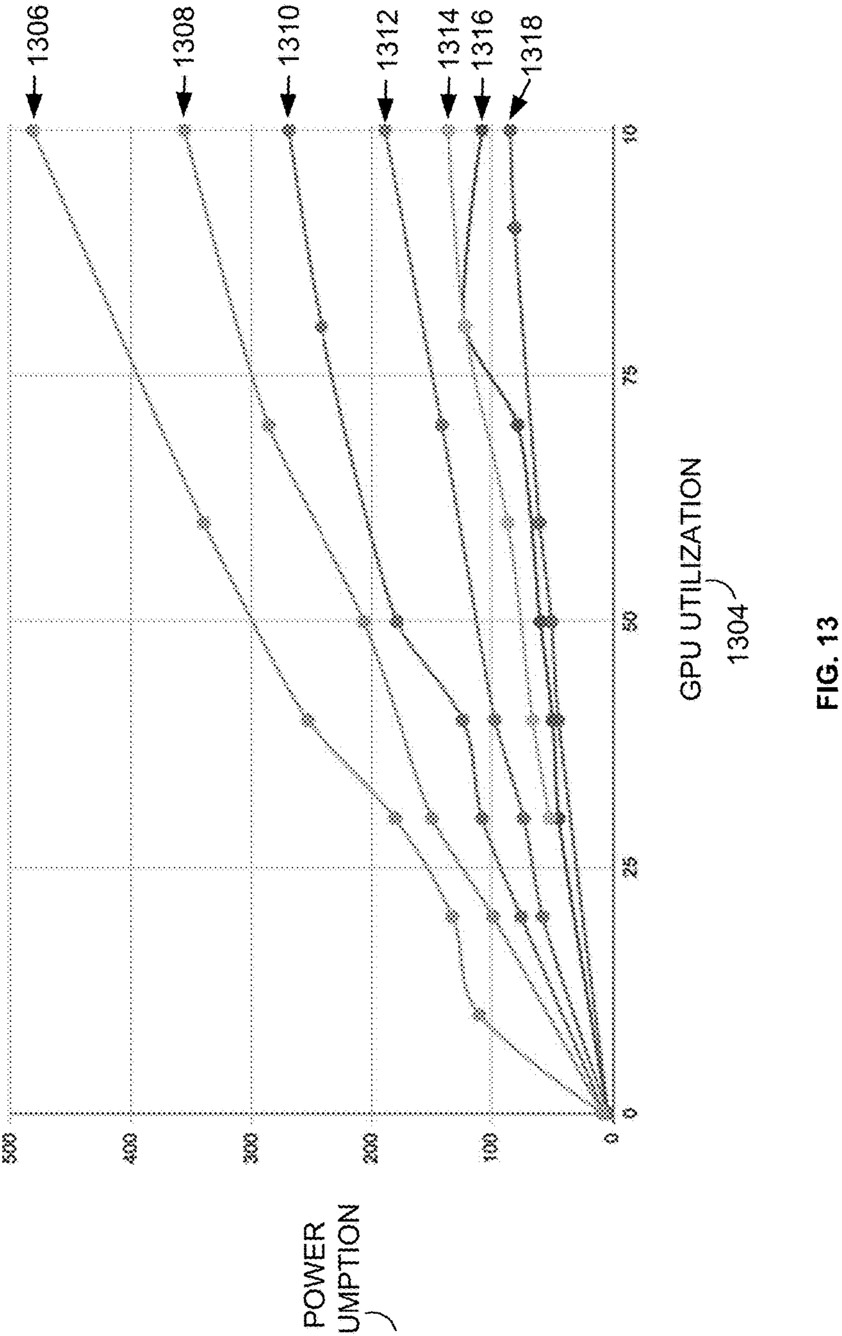
FIG. 13 illustrates a graph of graphics processing unit (GPU) utilization vs. power consumption for different operating frequencies of the GPU, in accordance with some embodiments.

FIG. 13 illustrates a graph 1300 of graphics processing unit (GPU) utilization vs. power consumption for different operating frequencies of the GPU, in accordance with some embodiments. The vertical axis is the GPU power consumption 1302. The GPU is a resource 1002 with the vertical axis being the GPU power consumption 1302, which, referring to FIG. 10, is the power consumption 1004. The horizontal axis is the GPU utilization 1304, which is the utilization 1006. And the state 1008 of the resource 1002 is the different operating frequencies 1306, 1308, 1310, 1312, 1314, 1316, and 1318. For example, operating frequency 1306 is 1.5 GHZ, operating frequency 1308 is 1.2 GHz, operating frequency 1310 is 1.0 GHz, operating frequency 1312 is 0.8 GHz, operating frequency 1314 is 0.6 GHz, operating frequency 1316 is 0.4 GHz, and operating frequency 1318 is 200 MHz.

Figure 14:
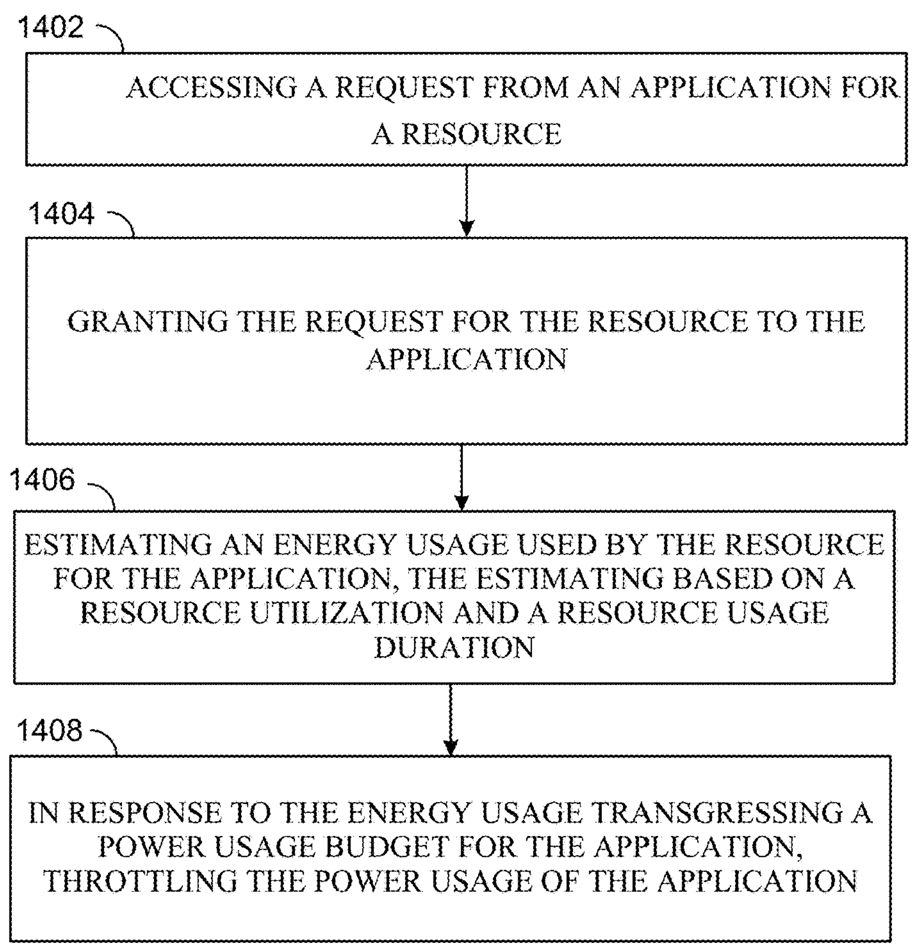
FIG. 14 illustrates a method for power attribution and throttling on mobile devices, in accordance with some examples.

FIG. 14 illustrates a method 1400 for power attribution and throttling on mobile devices, in accordance with some examples. The method 1400 begins at operation 1402 with accessing a request from an application for a resource. For example, the operating system 942 accesses a request from a process 1019 for a resource 1002. The method 1400 continues at operation 1404 with granting the request for the resource to the application. For example, the operating system 942 may grant the request for the resource 1002 to the process 1019. The resource 1002 may be a GPU, in accordance with some examples.

The method 1400 continues at operation 1406 with estimating an energy usage used by the resource for the application, the estimating based on a resource utilization and a resource usage duration. For example, the operating system 942 maintains information regarding the use of the resource 1002 by the process 1019 such as the energy used 1024 for the resource 1025. The operating system 942 uses predetermined estimates for the power consumption 1004 of the resource 1002 based on the utilization 1006 by the process 1019. The kernel module 1030 may keep track of which process 1019 is using which resource 1002 to determine the utilization 1006.

The method 1400 continues at operation 1408 with throttling the power usage of the application. In response to the power usage transgressing a power usage budget for the application. For example, the throttle module 1018 may call the throttle module 1020 of the process 1019 for the process 1019 to reduce its energy used 1024. In another example, the throttle module 1018 changes the state 1008 of the resource 1002 to a state 1008 that reduces the power consumption 1004 of the resource 1002.

The method 1400 may optionally include one or more additional operations. The operations of method 1400 may be performed in a different order. One or more of the operations of method 1400 may be optional. The method 1400 may be performed in whole or in part by an apparatus of the head-wearable apparatus 116, the glasses 800, the server system 504, the computing device 114, and so forth.

CONCLUSION

Examples enable a mobile device such as head-wearable apparatus 116 to attribute power consumption 1004 and temperature generation 1010 used by processes 1019 on a per resource 1002 bases. The processes 1019, which may be end-user applications 928, 944, receive information regarding energy used 1024 and temperature used 1028 on a per resource 1025, 1029 bases. This enables the applications 928, 944 to better use their energy budget 1022 and temperature budget 1026. Additionally, the mobile device may throttle a process 1019 that exceeds an energy budget 1022 or temperature budget 1026.

Glossary

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. Additional claimable subject matter further includes the following:

Example 1 is a mobile device including: a processor; and a memory storing instructions that, when executed by the processor, configure the mobile device to perform operations including: accessing a request from an application for a resource; granting the request for the resource to the application; estimating an energy usage used by the resource for the application, the estimating based on a resource utilization and a resource usage duration; and in response to the energy usage transgressing a power usage budget for the application, throttling a power usage of the application.

In Example 2, the subject matter of Example 1 includes, where the estimating is further based on a resource state.

In Example 3, the subject matter of Example 2 includes, where throttling the power usage of the application includes: changing the resource state to a different resource state, the resource in the different resource state having a lower power usage than the resource in the resource state.

In Example 4, the subject matter of Examples 1-3 includes, where throttling the power usage of the application includes: calling a throttling application associated with the application.

In Example 5, the subject matter of Examples 1~4 includes, where throttling the power usage of the application includes: lowering a priority of the application relative to other applications or suspending the application for a predetermined duration.

In Example 6, the subject matter of Examples 1-5 includes, where the operations further include: sending the estimated energy usage to the application.

In Example 7, the subject matter of Example 6 includes, where the estimate energy usage includes estimated power usage for one or more software modules used by the application and one or more hardware modules used by the application.

In Example 8, the subject matter of Examples 1-7 includes, where the power usage budget is an amount of energy.

In Example 9, the subject matter of Examples 1-8 includes, where the operations further include: estimating a temperature usage used by the resource for the application, the estimating based on a temperature change of the resource.

In Example 10, the subject matter of Examples 1-9 includes, where the operations further include: in response to a temperature of the resource exceeding a threshold value, throttling the power usage of the application.

In Example 11, the subject matter of Examples 1-10 includes, where the operations further include: in response to a battery level of the mobile device transgressing a threshold level, throttling the power usage of the application.

In Example 12, the subject matter of Examples 1-11 includes, where the operations further include: in response to the application releasing the resource, sending to the application the energy usage.

In Example 13, the subject matter of Examples 1-12 includes, where the operations further include: accessing a request from the application to change a resource state; and changing the resource state in accordance with the request.

In Example 14, the subject matter of Examples 1-13 includes, where the estimating the energy usage is based on empirical tests of power usage for the resource utilization with the resource in a resource state.

In Example 15, the subject matter of Example 14 includes, where the empirical tests are based on unit tests and end-to-end tests.

In Example 16, the subject matter of Examples 1-15 includes, where the estimating the energy usage is based on estimates of the energy usage based on a change in an energy stored in a battery.

In Example 17, the subject matter of Examples 1-16 includes, where the mobile device is a head-wearable augmented reality (AR), virtual reality (VR), or mixed reality (MR), apparatus.

Example 18 is a non-transitory computer-readable storage medium including instructions that, when processed by a mobile device, configure the mobile device to perform operations including: accessing a request from an application for a resource; granting the request for the resource to the application; estimating an energy usage used by the resource for the application, the estimating based on a resource utilization and a resource usage duration; and in response to the energy usage transgressing a power usage budget for the application, throttling a power usage of the application.

In Example 19, the subject matter of Example 18 includes, where the estimating is further based on a resource state.

Example 20 is a method performed on a mobile device, the method including: accessing a request from an application for a resource; granting the request for the resource to the application; estimating an energy usage used by the resource for the application, the estimating based on a resource utilization and a resource usage duration; and in response to the energy usage transgressing a power usage budget for the application, throttling a power usage of the application.

Example 21 is at least one machine-readable medium including instructions that, when executed by processing circuitry, cause the processing circuitry to perform operations to implement of any of Examples 1-20.

Example 22 is an apparatus including means to implement of any of Examples 1-20.

Example 23 is a system to implement of any of Examples 1-20.

Example 24 is a method to implement of any of Examples 1-20.

What is claimed is:

1. A mobile device comprising:

at least one processor; and a memory storing instructions that, when executed by the at least one processor, configure the mobile device to perform operations comprising:

accessing a request from an application for a resource;

granting the request for the resource to the application;

estimating a temperature usage from a temperature usage budget used by the resource for the application, the estimating based on a temperature change of the resource;

estimating an energy usage used by the resource for the application, the estimating based on a resource utilization and a resource usage duration; and in response to the energy usage transgressing a power usage budget allocated to the application for the energy usage or the temperature usage transgressing the temperature usage budget allocated to the application for the temperature usage, throttling a power usage of the application.

2. The mobile device of claim 1, wherein the estimating is further based on a resource state.

3. The mobile device of claim 2, wherein throttling the power usage of the application comprises: changing the resource state to a different resource state, the resource in the different resource state having a lower power usage than the resource in the resource state.

4. The mobile device of claim 1, wherein throttling the power usage of the application comprises: calling a throttling application associated with the application.

5. The mobile device of claim 1, wherein throttling the power usage of the application comprises: lowering a priority of the application relative to other applications or suspending the application for a predetermined duration.

6. The mobile device of claim 1, wherein the operations further comprise:

sending the estimated energy usage to the application.

7. The mobile device of claim 6, wherein the estimate energy usage comprises estimated power usage for one or more software modules used by the application and one or more hardware modules used by the application.

8. The mobile device of claim 1, wherein the power usage budget is an amount of energy.

9. The mobile device of claim 1, wherein the operations further comprise:

in response to a temperature of the resource exceeding a threshold value, throttling the power usage of the application.

10. The mobile device of claim 1, wherein the operations further comprise:

in response to a battery level of the mobile device transgressing a threshold level, throttling the power usage of the application.

11. The mobile device of claim 1, wherein the operations further comprise:

in response to the application releasing the resource, sending to the application the energy usage.

12. The mobile device of claim 1, wherein the operations further comprise:

accessing a request from the application to change a resource state; and changing the resource state in accordance with the request.

13. The mobile device of claim 1, wherein the estimating the energy usage is based on empirical tests of power usage for the resource utilization with the resource in a resource state.

14. The mobile device of claim 13, wherein the empirical tests are based on unit tests and end-to-end tests.

15. The mobile device of claim 1, wherein the estimating the energy usage is based on estimates of the energy usage based on a change in an energy stored in a battery.

16. The mobile device of claim 1, wherein the mobile device is a head-wearable augmented reality (AR), virtual reality (VR), or mixed reality (MR), apparatus.

17. A non-transitory computer-readable storage medium including instructions that, when processed by a mobile device, configure the mobile device to perform operations comprising:

accessing a request from an application for a resource;

granting the request for the resource to the application;

estimating a temperature usage from a temperature usage budget used by the resource for the application, the estimating based on a temperature change of the resource;

estimating an energy usage used by the resource for the application, the estimating based on a resource utilization and a resource usage duration; and in response to the energy usage transgressing a power usage budget allocated to the application for the energy usage or the temperature usage transgressing the temperature usage budget allocated to the application for the temperature usage, throttling a power usage of the application.

18. The non-transitory computer-readable storage medium of claim 17, wherein the estimating is further based on a resource state.

19. The non-transitory computer-readable storage medium of claim 18, wherein throttling the power usage of the application comprises: changing the resource state to a different resource state, the resource in the different resource state having a lower power usage than the resource in the resource state.

20. A method performed on a mobile device, the method comprising:

accessing a request from an application for a resource;

granting the request for the resource to the application;

estimating a temperature usage from a temperature usage budget used by the resource for the application, the estimating based on a temperature change of the resource;

estimating an energy usage used by the resource for the application, the estimating based on a resource utilization and a resource usage duration; and in response to the energy usage transgressing a power usage budget allocated to the application for the energy usage or the temperature usage transgressing the temperature usage budget allocated to the application for the temperature usage, throttling a power usage of the application.

* * * * *